United States Patent [19]

Kervagoret

[11] Patent Number: 4,825,751
[45] Date of Patent: May 2, 1989

[54] CONTROLLED BYPASS AND FLOW-CONTROL VALVE UNIT FOR HYDRAULIC POWER STEERING SYSTEM

[75] Inventor: Gilbert Kervagoret, Argenteuil, France

[73] Assignee: Bendix France, Drancy, France

[21] Appl. No.: 94,356

[22] Filed: Sep. 4, 1987

[30] Foreign Application Priority Data

Sep. 18, 1986 [FR] France ............... 86 13077

[51] Int. Cl.⁴ .................. B62D 5/08; B62D 5/087
[52] U.S. Cl. ................................. 91/420; 91/446; 91/459; 91/468; 137/115; 180/142
[58] Field of Search .......... 91/420, 433, 446, 450–452, 91/468, 459; 60/547.2, 547.3; 137/115; 180/142

[56] References Cited

U.S. PATENT DOCUMENTS

| 3,596,677 | 8/1973 | Clark et al. | 137/501 |
| 3,901,343 | 8/1975 | Inoue | 91/450 X |
| 3,980,779 | 9/1975 | Inoue | 91/450 X |
| 4,211,254 | 7/1980 | Dyal | 91/446 X |
| 4,462,566 | 7/1984 | French | 91/446 X |
| 4,485,883 | 12/1984 | Duffy | 180/142 |
| 4,555,977 | 12/1985 | Motzer | 91/446 |
| 4,681,184 | 7/1987 | Suzuki et al. | 180/142 X |

FOREIGN PATENT DOCUMENTS 0072732 2/1983 European Pat. Off. .
0071909 2/1983 European Pat. Off. .
0089512 9/1983 European Pat. Off. .

Primary Examiner—Robert E. Garrett
Assistant Examiner—George Kapsalas
Attorney, Agent, or Firm—Larry J. Palguta; Ken C. Decker

[57] ABSTRACT

The device comprises a pilot slide (27) controlled by a pressure differential (P-P') determined by an electromagnetic pilot valve element (43) located in a return circuit to a tank (7) which is common to both the hydraulic installation and a branch pipe (8). The device preferably includes an isolating valve (40) connected to the pilot valve element (43) so as to isolate a pilot chamber (30) in the event of a failure of the electromagnetic actuator.

9 Claims, 2 Drawing Sheets

CONTROLLED BYPASS AND FLOW-CONTROL VALVE UNIT FOR HYDRAULIC POWER STEERING SYSTEM

BACKGROUND OF THE INVENTION

1. Field of the Invention

The present invention relates to flow-control servo-devices for a hydraulic system, especially for the power-assisted steering of a vehicle, comprising a pressure source having an outlet connected to an inlet of a hydraulic distributor of the open center type for controlling a hydraulic motor, the distributor having a return outlet towards a tank and, more particularly, a device of the type comprising, in a body, a slide modulator assembly inserted in a branch circuit between the outlet of the pressure source and the tank and controlled hydraulically, as a result of a pressure differential effect, by an electromagnetically controlled pilot valve generating the pressure differential.

2. Description of the Prior Art

A flow-control device of this type is described in the document EP-A-0 072 732 in the applicant's name. In the device of that document, the pilot valve is arranged between the pilot chamber of the slide modulator and the outlet to the tank, thereby modulating a leakage flow which is a function of the pilot pressure which itself varies as a function of the fluctuations at the outlet of the pressure source, the arrangement being difficult to adjust and requiring relatively sophisticated electronics for controlling the pilot valve.

SUMMARY OF THE INVENTION

It is therefore an object of the invention to provide a device of the type in question in a new arrangement, with a more stable and more reliable mode of operation and making it possible to simplify the control electronics.

For this purpose, according to one feature of the invention, the pilot valve is arranged between the tank and an intermediate point of the branch circuit, to which the return outlet of the distributor is connected, the intermediate point itself being located directly downstream of the modulator assembly.

Because of such an arrangement, the pressure differential generated by the pilot valve and controlling the modulator assembly depends only on the opening of the pilot valve, since the entire flow feeding the hydraulic system, that is to say consequently a substantially constant flow, passes through the latter.

It is another object of the invention to provide a device of the type defined above, which memorizes a specific operating condition in the event of the failure of the control electronics of the pilot valve, thus ensuring increased safety.

For this purpose, according to another feature of the invention, the modulator assembly comprises a pilot slide actuatable by means of the pressure differential on either side of the pilot valve and lockable in any position by an isolating valve coupled to the pilot valve in the event of the failure of the electromagnetic control device of the latter.

BRIEF DESCRIPTION OF THE DRAWINGS

The invention will now be described by way of example with reference to the accompanying drawings in which.

DETAILED DESCRIPTION OF THE PREFERRED EMBODIMENTS

Figure 1:
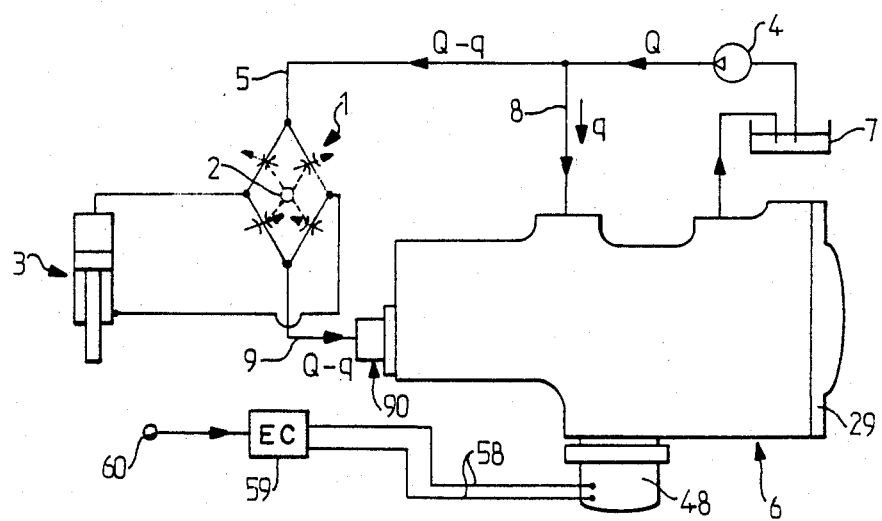
FIG. 1 is a diagrammatic view of a hydraulic system for the power-assisted steering of a vehicle, containing a device according to the invention.

FIG. 1 shows a hydraulic system for the power-assisted steering of a vehicle, comprising a distributor of the open-center type 1, for example of the rotary-valve type, controlled by an actuator member 2 typically connected to the steering-wheel of the vehicle (not shown), in order to feed the opposing chambers of a hydraulic motor 3 selectively with a modulated fluid pressure coming from a pressurized-fluid source 4 connected to a high-pressure inlet 5 of the distributor 1.

According to the invention, a branched flow-control servo-device, designated as a whole by the reference 6, is inserted between a low-pressure reservoir or tank 7, from which the pressure source 4 typically draws, and, on the other hand, a branch pipe 8 connected at an intermediate point between the pressure source 4 and the high-pressure inlet 5 of the distributor 1 and, on the other hand, the return outlet 9 towards the tank 7 of the distributor 1.

Figure 2:
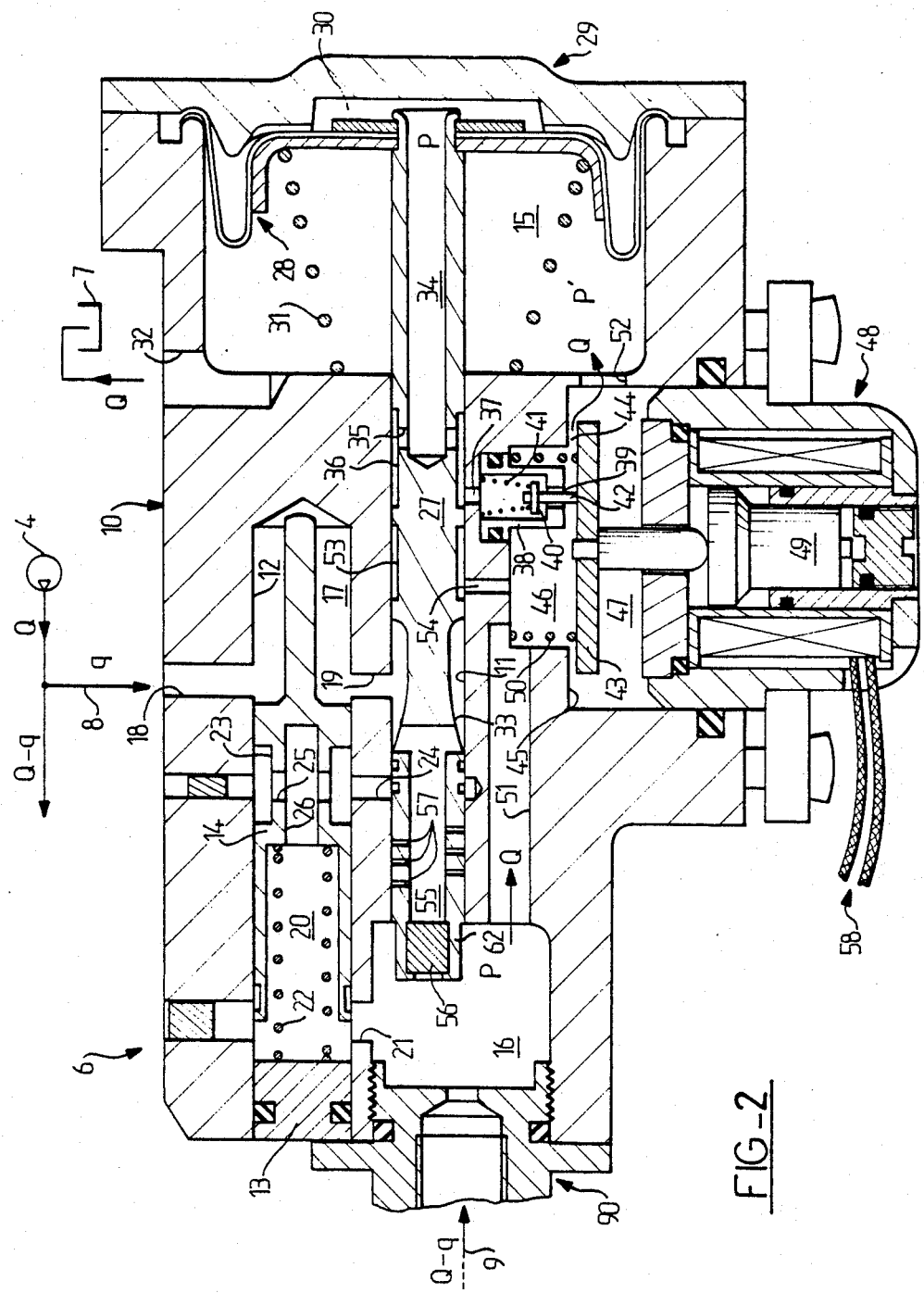
FIG. 2 is a diagrammatic sectional view of the device according to the invention.

As can be seen clearly in FIG. 2, the device 6 has a body 10 in which a first bore 11 and a second bore 12 advantageously parallel to one another are made. The second bore 12 is a blind bore which is closed by a plug 13 and in which a flow-regulating slide 14 of the closed-center type is slidably mounted, while the first bore 11 opens on one side into an outlet chamber 17 into which open an inlet passage 18, intended to be connected to the branch pipe 8, and a passage 19 communicating with the first bore 11. In the second bore 12, the slide 14 delimits another chamber 20 closed by the plug 13 and communicating with the intermediate chamber 16 via a regulating orifice 21 capable of being partially shut off selectively (thus constituting a variable throttle) by the adjacent end of the slide 14 which is stressed in the direction towards the inlet chamber 17 by a spring 22 bearing on the plug 13. The slide 14 has a peripheral annular groove 23 which communicates with another passage 24 putting the first bore 11 in communication with the second bore 12, and with the other chamber 20 via a radial passage 25 and an axial inner passage 26.

Mounted slidably in the first bore 11 is a pilot slide or needle 27, of which one end projecting into the outlet chamber 15 is integral with a piston means, typically of the type with an elastic diaphragm 28 secured by means of its periphery between the body 10 and a cover 29 attached to the body, the diaphragm 28 thus separating the outlet chamber 15 from a pilot chamber 30 delimited on the outside by the cover 29. The diaphragm 28, and consequently the slide 27, is stressed in the direction towards the cover 29 by a spring 31 arranged in the outlet chamber 15 into which opens an outlet passage 32 intended to be connected to the tank 7. The slide 27 has, between the passages 19 and 24, an annular peripheral groove with a cone-shaped profile 33 communicating permanently with the passage 19 and communicating selectively, depending on the position of the slide 27, with the passage 24 opening into the annular groove 23 of the slide 14, thereby forming, with the passage 24, a variable throttle. The end of the slide 27 connected to the diaphragm 28 has on the inside a blind axial bore 34 communicating permanently with the pilot chamber 30 and, via a radial passage 35, with a peripheral annular groove 36 into which opens a passage 37 which establishes communication between the first bore 11 and an inner chamber formed in a valve body 38 defining a valve passage 39 which can be shut off selectively by a valve element 40 stressed by a spring 41 in a direction tending to shut off the passage 39 and integral with a rod 42 extending through the passage 39 and, under the effect of the spring 41, bearing against a pilot valve element 43, typically in the form of an annular plate, defining an annular fluid passage of variable cross-section 44 with an annular shoulder 45 between a cylindrical chamber 46, into which the valve body 38 partially extends, and a cavity 47, in which is mounted sealingly a solenoid actuator 48 having a plunger 49, with which the pilot valve element 43 interacts, via a central shaft, by coming up against it under the effect of a spring 50 arranged in the cylindrical chamber 46. The cylindrical chamber 46 communicates permanently with the intermediate chamber 16 via a passage 51 made in the body 10 advantageously parallel to the first bore 11, and the cavity 47 communicates permanently with the outlet chamber 15 via a passage 52 made in the body 10. The intermediate chamber 16 is delimited on the outside by a connecting cover 90 for connection to the return outlet 9 of the distributor 1.

In the embodiment illustrated, the slide 27 has, between the grooves 33 and 36, an intermediate peripheral annular groove 53 into which opens a passage 54 formed between the first bore 11 and the cylindrical chamber 46, to prevent the high pressure in the groove 33 from possibly entering the groove 36 and from there passing towards the pilot chamber 30. Moreover, one end 62 of the slide 27, opposite the diaphragm 28, advantageously projects into the intermediate chamber 16 and has an axial bore 55 closed off on the outside by a plug 56 and communicating with the groove 33 and with a series of radial throttles 57 arranged at an axial distance from one another and opening into the bore 55, so as to produce a leakage flow between the groove 33 and the chamber 16 selectively, when the pressure differential between the pilot chamber 30 and the outlet chamber 15 exceeds a specific value. The winding of the solenoid valve 48 is connected by means of conductors 58 to an electronic control box 59 which prepares control signals for the solenoid valve 48 as a function of significant operating parameters of the vehicle, especially its speed, supplied by at least one sensor 60. Preferably, the solenoid valve 48 will be of the type with a large air gap (for example, of the order of 3 mm), in comparison with which the variations of the passage 44 are negligible (with a valve lift of the order of 0.1 mm for a valve 43 having a diameter of 20 mm), thus constituting a system with a virtually constant air gap.

The mode of operation of the device according to the invention is as follows: depending on the position of the slides 27 and 14, a branch flow q (for example, up to 3 litres per minute for a nominal pump flow Q of 5 litres per minute) can be subtracted from the flow Q conveyed from the source 4 to the inlet 5 of the distributor 1, via the branch circuit 8, at the same time passing through the inlet chamber 17, the groove 33, the passage 24, the chamber 20 and the regulating passage 21, in order to combine again, in the intermediate chamber 16, with the outlet flow Q-q coming from the distributor 1, the entire flow Q from the pressure source 4 thus entering the cylindrical chamber 46 via the passage 51.

Because of this special arrangement, a pressure p prevails in the intermediate chamber 16, in the cylindrical chamber 46 and, when the passage 39 is open, in the pilot chamber 30, while as a function of the annular passage 44 a reduced pressure p' prevails in the cavity 47 and in the outlet chamber 15, the difference P-P' depending only on the opening of the valve element 43 and therefore on the control intensity of the solenoid valve 48, the flow Q through the annular passage 44 being substantially constant. This pressure differential P-P', counter to the force of the spring 31, determines the position of the slide 27 and consequently the magnitude of the branch flow q, the small fluctuations of which are regulated by the slide 14. In the event of a failure in the electrical supply to the solenoid valve 48, the valve element 43, under the combined effect of the pressure differential P-P' and the spring 50, moves in a direction tending to open the annular passage 44, thus causing the passage 39 to be closed by the valve 40, thereby isolating the pilot chamber 30 from the cylindrical chamber 46, so that the device remains in the position which it previously occupied at the moment of electrical failure, consequently without suddenly changing the behavior of the hydraulic system as a result of this failure. It will be noted that, in the event of a persistent failure of the electrical control of the solenoid valve 48, the device tends to assume a configuration preventing any branching off of the flow, thus guaranteeing that the hydraulic system operates with full available power, this being especially beneficial in the operations of parking the vehicle, ensuring a minimum pressure drop in the return circuit from the distributor 1 to the tank 7.

Although the present invention has been described with regard to a particular embodiment, it is not limited thereby, but on the contrary is capable of having modifications and alternative forms which will become evident to a person skilled in the art.

I claim:

1. A flow-control servo device for a hydraulic system, especially for the power-assisted steering of a vehicle, comprising a pressure source having an outlet connected to an inlet of a distributor of open-center type for controlling a hyraulic motor, the distributor having a return outlet toward a tank, the device comprising, in a body, a slide modulator assembly inserted in a branch circuit between the outlet of the pressure source and the tank and controlled hydraulically, as a result of a pressure differential, by a pilot valve controlled electromagnetically and generating the pressure differential, characterized in that the pilot valve is arranged between the tank and an intermediate point of the branch circuit to which the return outlet of the distributor is connected, the intermediate point being located directly downstream of the modulator assembly, the modulator assembly comprising a pilot slide actuatable by means of the pressure differential on either side of the pilot valve and lockable in any previously assumed position by means of an isolating valve coupled to the pilot valve, in the event of electrical failure of the electromagnetic control of the pilot valve.

2. The device according to claim 1, characterized in that the pilot slide is mounted slidably in a first bore in the body and opening into a first chamber formed in the body, the first chamber separated from a second chamber by a movable wall integral iwth a first end of the pilot slide, the first chamber being interposed between the pilot valve and the tank, and the second chamber being connected to the intermediate point of the branch circuit via the isolating valve.

3. The device according to claim 2, characterized in that the modulator assembly comprises a regulating slide which is stressed by a spring, slides in a second bore of the body, divides the second bore into a third chamber connected to the outlet of the pressure source and a fourth chamber, and interacts with a first passage connecting the fourth chamber to a fifth chamber in the body, the fifth chamber forming the intermediate point of the branch circuit.

4. The device according to claim 3, characterized in that the pilot slide has a profiled peripheral groove which communicates with the third chamber and interacts selectively with a second orifice connecting the first bore and second bore, the second orifice communicating with a peripheral groove of the regulating slide, and the peripheral groove of the regulating slide communicating permanently with the fourth chamber.

5. The device according to claim 4, characterized in that the pilot valve interacts with an annular shoulder forming a valve seat between a sixth chamber and a seventh chamber which are formed in the body and which communicate permanently with the fifth chamber and first chamber, respectively.

6. The device according to claim 5, characterized in that the isolating valve is arranged between the sixth chamber and a passage opening into the first bore and communicating with a peripheral groove of the pilot slide, the peripheral groove of the pilot slide communicating with the second chamber via a passage in the pilot slide.

7. The device according to claim 6, characterized in that the first bore opens, opposite the first chamber, into the fifth chamber, the pilot slide having a second end opposite the movable wall and extending into the fifth chamber.

8. The device according to claim 7, characterized in that the pilot slide has, in the second end, an inner passage between the profiled peripheral groove and a series of calibrated orifices arranged at an axial distance from one another and opening radially into the first bore.

9. The device according to claim 8, characterized in that the pilot valve comprises a circular plate which is stressed away from the annular shoulder by a spring arranged in the sixth chamber, and the circular plate associated with a plunger of an electromagnetic actuator mounted in the seventh chamber.

* * * * *